DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 7

T950,011

PRODUCTION OF SOLID AMMONIUM POLYPHOSPHATE BY CONTROLLED COOLING

Gordon C. Hicks, Sheffield, and George H. Megar, Florence, Ala., assignors to Tennessee Valley Authority

Filed Nov. 6, 1975, Ser. No. 629,281
Int. Cl.² C05B 7/00
U.S. Cl. 71—34
1 Sheet Drawing. 9 Pages Specification

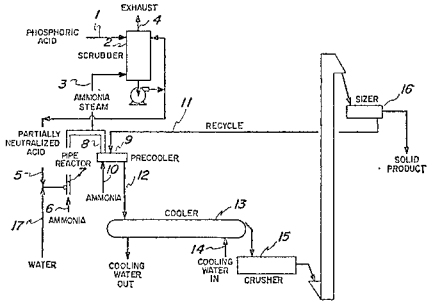

FLOWSHEET OF SOLIDIFICATION PROCESS FOR AMMONIUM POLYPHOSPHATE

Process for the production of solid ammonium polyphosphate in which ammonium phosphate melt is prepared in a pipe reactor and is solidified by controlled cooling to form crystals of a size and in quantity suitable to yield a hard, nontacky, and friable solid. Wet-process phosphoric acid is ammoniated in a pipe reactor to an $NH_3:H_3PO_4$ mole ratio of about 1.0, and the resulting melt is agitated and simultaneously partially cooled by introduction of cool recycled pulverized product into the melt, by blowing air through the melt, or by passing the melt through a water-jacketed trough. The partially cooled melt is then solidified continuously into nontacky sheets on a water-cooled metal surface using water or steam to slowly remove sensible heat and heat of crystallization. Up to about 55 percent or higher of the $P_2O_5$ in the product may be polyphosphate, the concentration of which is varied by controlling the reaction temperature with change in water input to the pipe reactor. With controlled cooling, the product is a hard, friable solid, whereas without controlled cooling, as in conventional granulation processes in which melt is added to cooled recycled fines in a drum or pugmill granulator, the product is a supersaturated solution with microcrystalline texture and is too soft and sticky to be handled.

PRODUCTION OF SOLID AMMONIUM POLYPHOSPHATE BY CONTROLLED COOLING
Original Filed Nov. 6, 1975
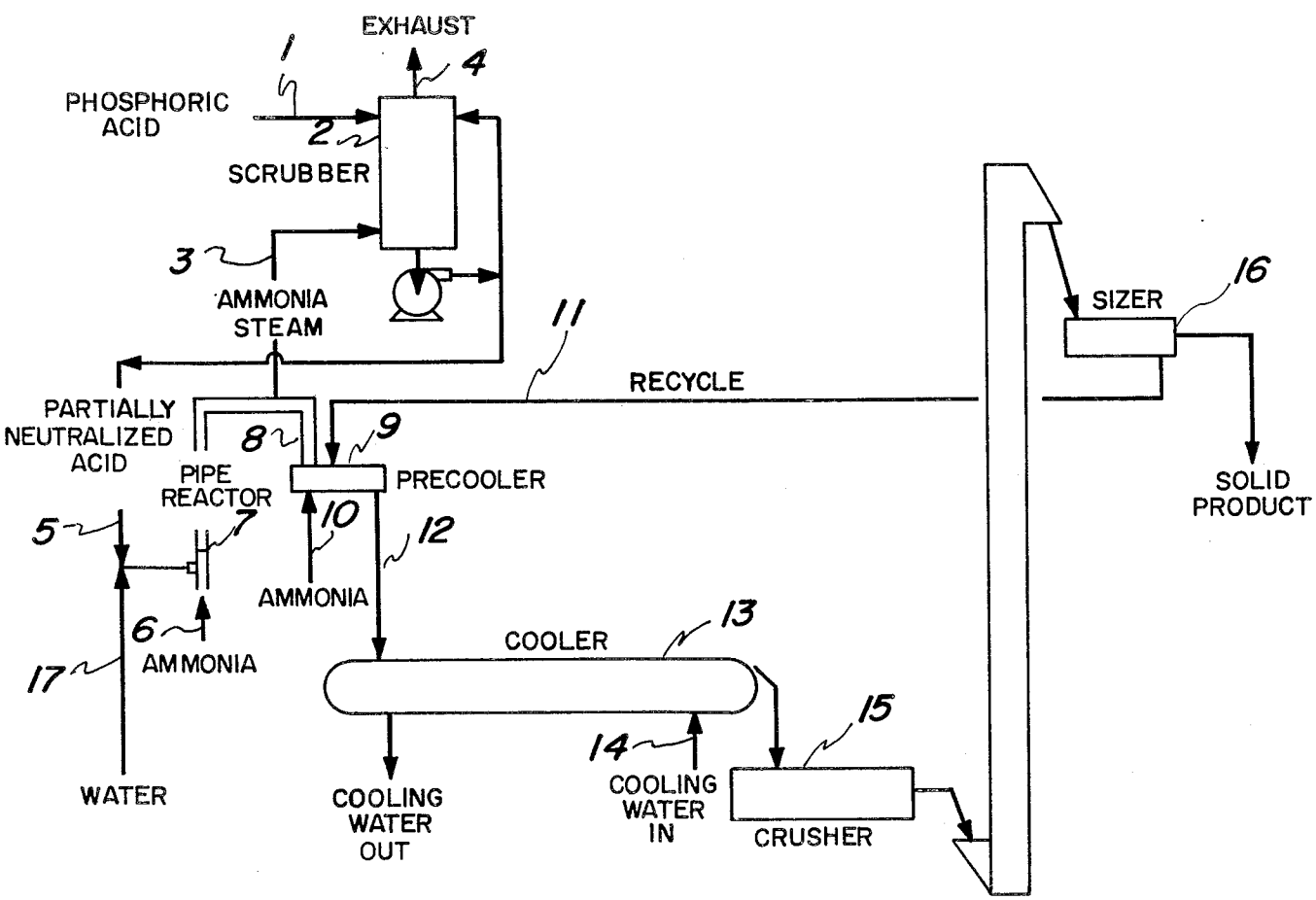
FLOWSHEET OF SOLIDIFICATION PROCESS FOR AMMONIUM POLYPHOSPHATE